US008915283B2

(12) United States Patent
Gelli et al.

(10) Patent No.: US 8,915,283 B2
(45) Date of Patent: Dec. 23, 2014

(54) MULTI-FUNCTION EMBOSSING UNIT

(75) Inventors: Mauro Gelli, Lucca (IT); Mauro Ricci, Lucca (IT); Alessandro Muchetti, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 725 days.

(21) Appl. No.: 12/449,766

(22) PCT Filed: Feb. 15, 2008

(86) PCT No.: PCT/IT2008/000096
§ 371 (c)(1),
(2), (4) Date: Aug. 26, 2009

(87) PCT Pub. No.: WO2008/105016
PCT Pub. Date: Sep. 4, 2008

(65) Prior Publication Data
US 2010/0000687 A1 Jan. 7, 2010

(30) Foreign Application Priority Data
Feb. 27, 2007 (IT) ................................ FI2007A0048

(51) Int. Cl.
*B29C 59/04* (2006.01)
*B31F 1/07* (2006.01)

(52) U.S. Cl.
CPC ........... *B31F 1/07* (2013.01); *B31F 2201/0753* (2013.01); *B31F 2201/0764* (2013.01); *B31F 2201/0766* (2013.01); *B31F 2201/0776* (2013.01); *B31F 2201/0782* (2013.01); *B31F 2201/0787* (2013.01)
USPC .......................................................... 156/553

(58) Field of Classification Search
CPC ............... B31F 1/07; B31F 2201/0753; B31F 2201/0764; B31F 2201/0766; B31F 2201/0776
USPC .......................................................... 156/553
See application file for complete search history.

(56) References Cited

U.S. PATENT DOCUMENTS

| | | | |
|---|---|---|---|
| 3,414,459 | A | 12/1968 | Wells |
| 3,556,907 | A | 1/1971 | Nystrand |
| 3,867,225 | A | 2/1975 | Nystrand |
| 3,961,119 | A | 6/1976 | Thomas |
| 5,096,527 | A | 3/1992 | Biagiotti |
| 5,173,351 | A | 12/1992 | Ruppel et al. |

(Continued)

FOREIGN PATENT DOCUMENTS

| | | | |
|---|---|---|---|
| EP | 1 097 803 | A1 | 5/2001 |
| WO | WO 99/41064 | | 8/1999 |
| WO | WO 2004/002727 | A1 | 1/2004 |
| WO | WO 2006/027809 | A1 | 3/2006 |

*Primary Examiner* — Philip Tucker
*Assistant Examiner* — Vicki Wu
(74) *Attorney, Agent, or Firm* — Breiner & Breiner, L.L.C.

(57) ABSTRACT

The embossing unit includes in combination: a first support for a first embossing roller and a second support for a first pressure roller, cooperating with the first embossing roller. The second support presents two seats to receive and support the first pressure roller in two different positions with respect to this support. The embossing unit also includes a third support for a second embossing roller. The third support can take at least two different operating positions. A fourth support is provided to support a second pressure roller suitable to cooperate with the second embossing roller and suitable to take at least an operating position and an idle position. Finally, there is provided a fifth support with a double seat to receive and support in two different positions alternatively a marrying roll or the second pressure roller.

26 Claims, 8 Drawing Sheets

(56) References Cited

U.S. PATENT DOCUMENTS

| | | | | |
|---|---|---|---|---|
| 5,339,730 | A | 8/1994 | Ruppel et al. | |
| 5,686,168 | A | 11/1997 | Laurent et al. | |
| 5,736,223 | A | 4/1998 | Laurent | |
| 5,846,636 | A | 12/1998 | Ruppel et al. | |
| 6,032,712 | A | 3/2000 | Biagiotti | |
| 6,053,232 | A | 4/2000 | Biagiotti | |
| 6,106,928 | A | 8/2000 | Laurent et al. | |
| 6,109,326 | A | 8/2000 | Leakey | |
| 6,113,723 | A | 9/2000 | McNeil et al. | |
| 6,136,413 | A | 10/2000 | Le Port et al. | |
| 6,245,414 | B1 | 6/2001 | Biagiotti | |
| 6,261,666 | B1 | 7/2001 | Enderby et al. | |
| 6,470,945 | B1 * | 10/2002 | Biagiotti | 156/553 |
| 6,578,617 | B1 | 6/2003 | Biagiotti | |
| 6,681,826 | B1 | 1/2004 | Biagiotti | |
| 6,755,928 | B1 | 6/2004 | Biagiotti | |
| 2007/0000615 | A1 * | 1/2007 | Catelli | 156/553 |

* cited by examiner

MULTI-FUNCTION EMBOSSING UNIT

TECHNICAL FIELD

The present invention relates to an embossing unit. More in particular, the present invention relates to an embossing unit for embossing a multi-ply web material, preferably made of tissue paper, for example to manufacture toilet paper, kitchen towels and other cellulose products.

BACKGROUND OF THE INVENTION

Embossing is one of the operations that are normally performed on plies or sheets of tissue paper, to produce paper articles for personal and household cleaning and hygiene, or also for commercial and industrial use, such as toilet paper, kitchen towels, paper napkins and handkerchiefs and the like.

Embossing is an operation that is performed for the dual purpose of improving aesthetic properties and increasing functional properties, in particular the softness, smoothness, absorption capacity or thickness of the finished material.

Normally, a tissue paper material, such as kitchen towel or toilet paper, is produced from two or more plies of paper embossed separately and subsequently bonded together by applying a glue and laminating the plies between counter-rotating rollers defining a lamination nip.

Embossing is typically performed by feeding each ply between an embossing roller, equipped with protuberances, and a pressure roller with an outer surface coated in yielding material, typically rubber. In this case this is known as steel to rubber embossing, as the embossing roller is typically made of steel. In some cases embossing is performed between two rollers made of steel or another hard material, one equipped with protuberances and the other with corresponding recesses. The protuberances of the embossing roller produce corresponding protuberances or projections in the paper ply. The protuberances formed in the two outermost plies are facing the inside of the finished product.

According to a possible technique (known as tip-to-tip"), the two plies of paper web material are bonded by making the protuberances of one ply coincide with the protuberances of the other ply, having previously applied glue to the protuberances of one of the two plies, or at least to some of said protuberances. In practice, two embossing rollers which emboss the two paper plies separately by means of respective pressure rollers, form therebetween a lamination nip, through which the two embossed plies are fed before being detached from said rollers. In the lamination nip the protuberances of one roller coincide with the protuberances of the other roller and the reciprocal distance between the rollers is such as to cause localized compression of the plies at said protuberances.

A tip-to-tip embossing unit for obtaining a product of this type is described in U.S. Pat. No. 3,414,459. The tip-to-tip embossing technique has gradually been perfected and improved, in order to solve particular problems arising with this processing method. U.S. Pat. No. 5,096,527 describes, for example, a technique to reduce the vibrations and wear in tip-to-tip embossing units. U.S. Pat. No. 6,113,723 describes a distribution of protuberances having the object of increasing the adhesion strength through a particular arrangement of the protuberances. U.S. Pat. No. 5,736,223 describes a method for producing a paper article in sheet form comprising three layers or plies of tissue paper.

U.S. Pat. No. 5,173,351; U.S. Pat. No. 6,032,712; U.S. Pat. No. 6,245,414; U.S. Pat. No. 6,053,232 describe embossing-laminating units which with particular measures prevent concentrated wear of the protuberances also when these do not completely coincide, but give rise to a partial correspondence in areas, between some of the protuberances of one roller and some of the protuberances of the other. U.S. Pat. No. 3,961,119 describes a tip-to-tip embossing unit, wherein two mutually cooperating embossing rollers are equipped with helical projections. The projections of one embossing roller present protrusions that mesh with recesses provided in the helical projections of the opposed embossing roller.

According to a different technique, the two plies are embossed separately, each between an embossing roller and a counter-roller or pressure roller. The two plies are then mutually joined so that the protuberances of one ply are nested between the protuberances of the other ply. This is known as "nested" embossing. Lamination of the two plies is obtained between one of the embossing rollers and a laminating roller, while the two embossing rollers do not touch. Examples of embossing-laminating devices of this type are described in U.S. Pat. No. 3,556,907; U.S. Pat. No. 3,867,225; U.S. Pat. No. 5,339,730.

U.S. Pat. No. 5,686,168 describes a method of nested embossing, wherein the plies are bonded by lamination between two opposed embossing rollers.

U.S. Pat. No. 6,578,617 and U.S. Pat. No. 6,470,945 describe embossing units that can perform embossing according to both the aforesaid techniques. To switch from tip-to-tip to nested embossing, the angular phase and/or the axial position of the two embossing rollers can be modified.

U.S. Pat. No. 6,261,666 describes a similar device for alternatively performing tip-to-tip or nested embossing. Another similar device is described in U.S. Pat. No. 6,109,326.

Initially, embossing was performed according to very simple geometric patterns, with uniform distribution of truncated-cone or truncated-pyramid shaped protuberances. This embossing had a prevalently technical function, used to produce a product of adequate thickness and with sufficient softness and absorption capacity.

Currently, embossing must increasingly achieve a dual function, both technical-functional and aesthetic. Therefore, embossing patterns and embossing devices have been developed which make it possible to obtain a product that is aesthetically pleasing and at the same time suitable to satisfy the aesthetic requirements and increasing commercial requirements demanded of these products. Embossing is no longer produced only through simple geometrical patterns, but by combinations of embossing areas of greater or lesser density (at times of micro-embossing) and of decorative patterns embossed and optionally printed. Examples of complex embossing patterns are described in U.S. Pat. No. 6,136,413; U.S. Pat. No. 5,846,636; U.S. Pat. No. 6,106,928.

A new embossing technique that makes it possible to obtain particularly refined and easily interchangeable motifs is described in U.S. Pat. No. 6,755,928 and in U.S. Pat. No. 6,681,826.

WO-A-2006/027809 describes a convertible embossing unit, wherein a pair of fixed sides cooperate with a pair of oscillating sides to define two pairs of supporting seats for the embossing rollers. In order to arrange the embossing rollers in two alternative positions, the mobile sides can cooperate directly with the fixed sides, or alternatively the fixed and mobile sides can be equipped with elements to close and complete the seats to support the ends of the embossing rollers. The embossing unit thus configured, although characterized by the possibility of modifying the arrangement of the rollers, has limited flexibility.

One of the requirements considered most necessary in the paper converting industry is the possibility to adapt production lines to different market demands, with fast and simple modifications of the line, to avoid stoppage thereof and consequent loss of production.

OBJECTS AND SUMMARY OF THE INVENTION

According to a possible embodiment, an object of the invention is to propose an embossing unit that can be easily adapted to various types of production and that can produce embossed materials according to one or other of different embossing techniques.

In substance, according to one embodiment of the invention there is provided an embossing unit to emboss and join at least two plies of web material, comprising in combination:

- a first support for a first embossing roller;
- a second support for a first pressure roller, cooperating with said first embossing roller, said second support having two seats to receive and support the first pressure roller in two different positions with respect to said second support;
- a third support, for a second embossing roller, said third support being capable of taking at least two different operating positions;
- a fourth support for a second pressure roller suitable to cooperate with said second embossing roller and suitable to take at least an operating position and an idle position;
- a fifth support with a double seat to receive and support in two different positions alternatively a marrying roller or said second pressure roller.

Further advantageous characteristics and embodiments of the invention are indicated in the appended claims and will be described with reference to a non-limiting embodiment of the invention. It must be understood that the invention also relates to an embossing unit comprising only some of the equipment and of the devices that allow the embossing unit to be configured in at least two distinct operating arrangements.

BRIEF DESCRIPTION OF THE DRAWINGS

The invention will be better understood by following the description and accompanying drawing, which shows a non-limiting practical embodiment of the invention. More in particular, in the drawing.

DETAILED DESCRIPTION OF AN EMBODIMENT OF THE INVENTION

Figure 1:
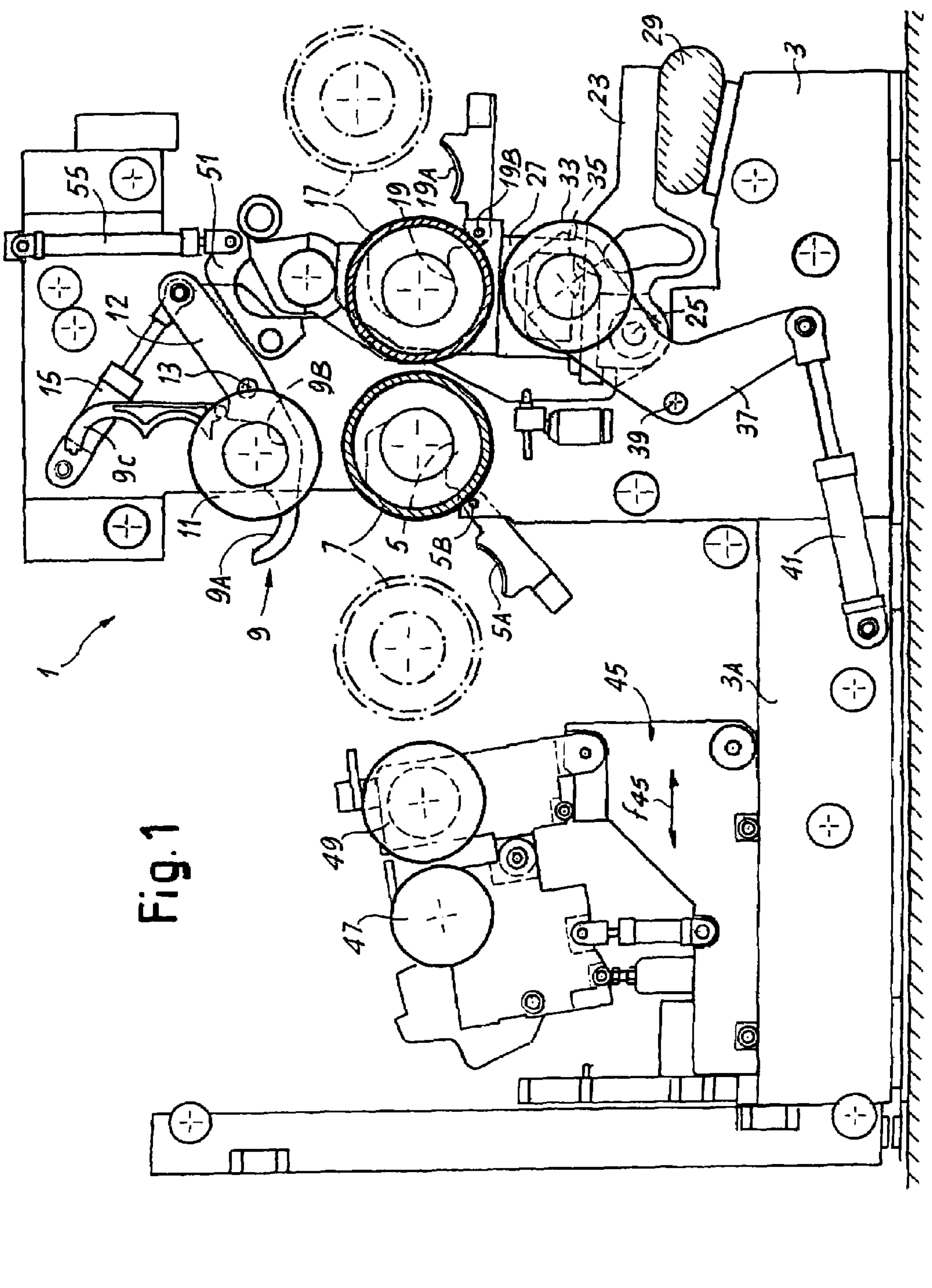
FIG. 1 shows an embossing unit according to the invention in a first configuration in the set-up phase.
Figure 2:
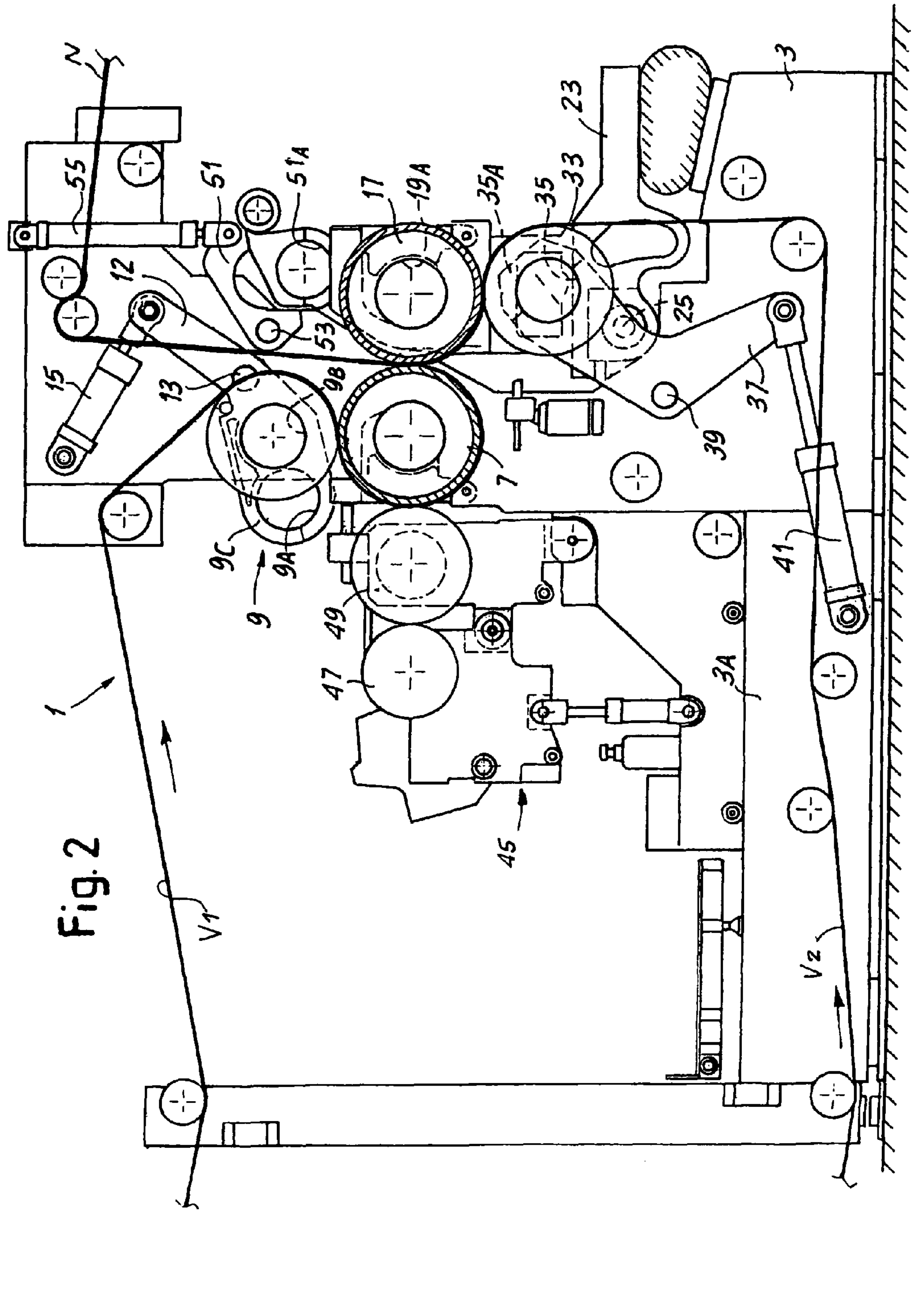
FIG. 2 shows the embossing unit in the configuration of FIG. 1, but in operating conditions.

With initial reference to FIGS. 1 and 2, there will firstly be described the configuration of the embossing unit according to the invention for embossing according to the tip-to-tip technique.

The embossing unit, indicated as a whole with 1, comprises a base structure 3, which in turn comprises, for example, a pair of parallel side members, on which the supports for the embossing rollers are arranged. There is associated with the structure 3 a first support 5 with a portion 5A by means of a hinge 5B, with which the portion 5A is hinged to the structure 3. In all the figures of the accompanying drawing, the embossing unit is in practice shown in a cross-section according to a longitudinal median plane arranged in an intermediate position between the two lateral side members of the machine. Therefore, in the drawing only one of the two side members forming the structure 3 is visible.

Hereunder and hereinbefore and also in the appended claims, when reference is made to a support for a roller this must in fact be understood as the pair of support elements on the two side members for the two ends of the respective roller. Therefore, returning to FIG. 1, the support 5 is in fact composed of two support elements, one on each of the two parallel side members that form the load-bearing structure 3.

In the support 5 there is housed a first embossing roller 7, for example a steel roller or in any case a roller made of a sufficiently hard material to perform the embossing operation on the web material that is fed to the embossing unit. In a manner known per se and not shown, the embossing roller 7 presents on the surface thereof embossing protuberances according to a suitable embossing pattern.

The embossing unit 1 also comprises a second support 9 for a first pressure roller 11. The pressure roller 11 can, for example, be composed of a roller coated with an elastically yielding material, such as rubber or the like, which cooperates with the first embossing roller 7. Also with regard to the support 9, it must be understood that in fact it presents two support elements, one for each side member forming the load-bearing structure 3. The support 9 comprises two seats 9A and 9B adjacent to each other and provided on an arm 12 hinged at 13 to the respective side member. The number 15 indicates a piston-cylinder actuator, which carries the arm 12 and therefore the pressure roller 11 to the operating position shown in FIG. 2. In practice, the arrangement is double, with an arm 12 on each side of the machine, to engage the two ends of the pressure roller 11, and preferably with a pair of piston-cylinder actuators 15, one for each side member of the load-bearing structure 3.

The two seats 9A, 9B are used alternatively according to the configuration taken by the embossing unit, as will be more apparent from the description below. In the configuration of FIGS. 1 and 2 the pressure roller 11 is arranged in the seat 9B closest to the pivot 13 of the arm 12.

The seats 9A, 9B are closed at the top by an element 9C (FIG. 2) that defines and completes the respective seats on the upper side and which is removed in order to move or replace the pressure roller 11.

The pressure roller 11 is housed in the seats 9A or 9B removing the top element 9C which is then fitted to the underlying portion 9A, 9B of the seats to clamp the roller 11 and support it in the position it must take during operation.

The embossing unit 1 comprises a third embossing roller 17 supported in a third support 19 provided with an openable portion 19A similar to the portion 5A that allows opening and closing of the support 5 of the first embossing roller 7. The portion 19A is pivoted in 19B to the respective side member of the load-bearing structure 3. In FIG. 1 the support 19 is shown open to allow insertion and removal of the embossing roller 17, while in FIG. 2 this support is shown closed to maintain the embossing roller 17 in its operating position. Also in this case, the support 19 is double, i.e. as a matter of fact it is composed of two substantially symmetrical support elements on the two side members of the machine, respectively.

Figure 1A:
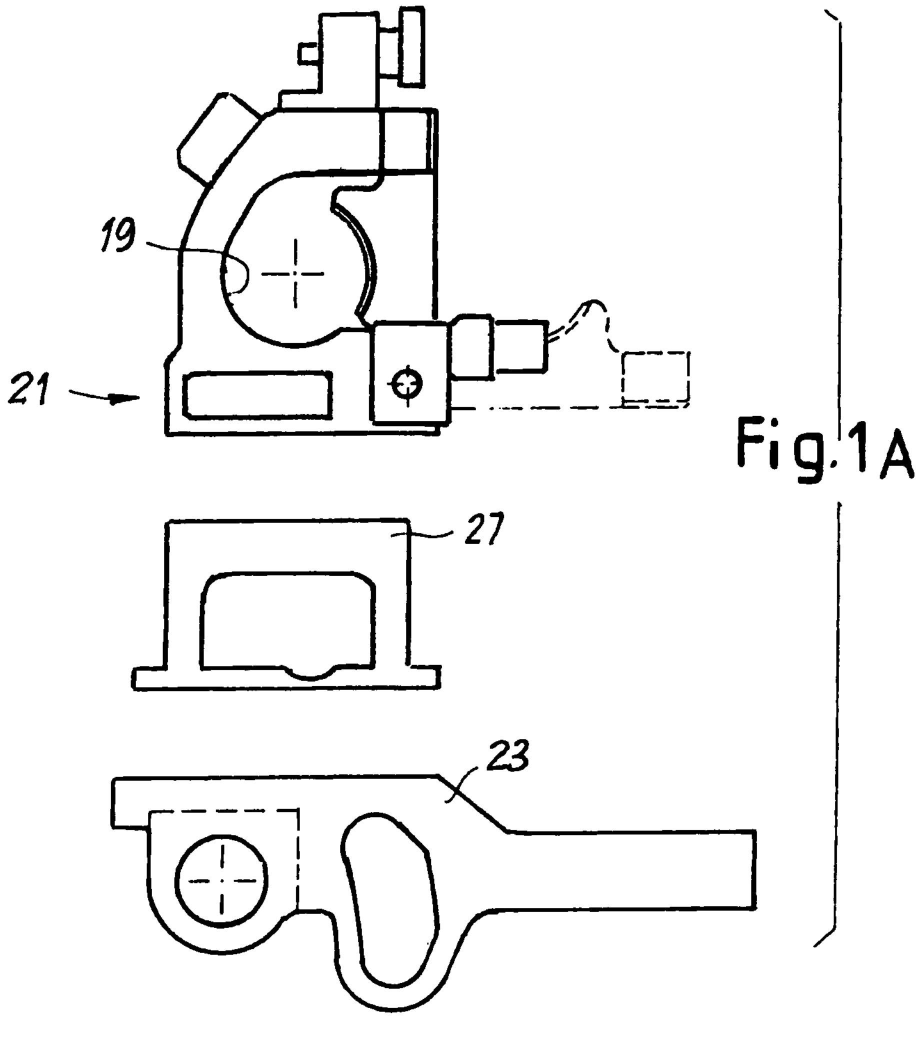
FIG. 1A shows a detail of the equipment utilized in the configuration of FIG. 1.

As shown in particular in the detail in FIG. 1A, the support 19 is not provided directly on the side member of the load-bearing structure 3, but on a fixture 21 fitted removably to an oscillating base 23 pivoted in 25 to the load-bearing structure 3. In the configuration of FIGS. 1 and 2, between the fixture 21 and the oscillating base 23 a spacer 27 is interposed, which allows the support 19 and therefore the embossing roller 17 to be placed at a suitable distance from the pivot 25. As shown in the figure, in this configuration the embossing rollers 7 and 17 are substantially arranged with their axes on a horizontal plane.

The number 29 indicates an actuator (called "Torpress") which presses between the structure 3 and the oscillating base 23 to cause the second embossing roller 17 to press against the first embossing roller 7, in a tip-to-tip arrangement, i.e. with at least some of the protuberances of the roller 7 pressing against at least some of the protuberances of the roller 17 in the nip defined between the embossing rollers.

With the second embossing roller 17 there cooperates a second pressure roller 33 supported in a support 35 provided in an oscillating arm 37 and formed of two openable portions, the movable one of which is indicated with 35A in FIG. 2. This allows opening of the support 35 and insertion or removal of the pressure roller 33. As in the case of the other supports, also this fourth support 25 is in fact formed of two support elements, one for each of the two side members of the embossing unit 1. Consequently, the oscillating arms 37 that carry the support 35 are also double. The arms 37 are pivoted in 39 to the load-bearing structure 3 and their oscillating movement is controlled by piston-cylinder actuators 41. The actuators 41 press the pressure roller 33 against the second embossing roller 17 to emboss the web material that passes through the nip formed by these rollers 33 and 17.

A base 3A for a gluing unit 45 is associated with the fixed structure 3, movable according to the double arrow f45 to move toward or away from the embossing roller 7.

The gluing unit 45 comprises cylinders 47, 49 that pick up the glue from a reservoir and transfer it to the web material fed around the embossing roller 7, all in a manner known per se and which does not require further description herein.

As can be observed in FIG. 2, when the embossing unit configured as in this example is in the operating position, the two embossing rollers 7 and 17 are pressed against each other to laminate therebetween two plies of web material V1, V2 fed to the pair of rollers 7, 11 and to the pair of rollers 17, 33 respectively. The ply V1 is embossed by the first embossing roller 7 and by the respective pressure roller 11, while the second ply V2 is embossed between the second embossing roller 17 and the relevant pressure roller 33. The reference N indicates the web material formed by joining and bonding the two plies V1, V2, which is delivered from the embossing unit 1.

In this configuration the pressure rollers 11 and 33 are located on opposite sides of the substantially horizontal geometrical plane on which the axes of rotation of the embossing rollers 7 and 17 lie.

The embossing unit described here can be reconfigured to take a different position of the embossing and pressure rollers, again arranged so as to operate in a tip-to-tip arrangement.

Figures 3, 3A:
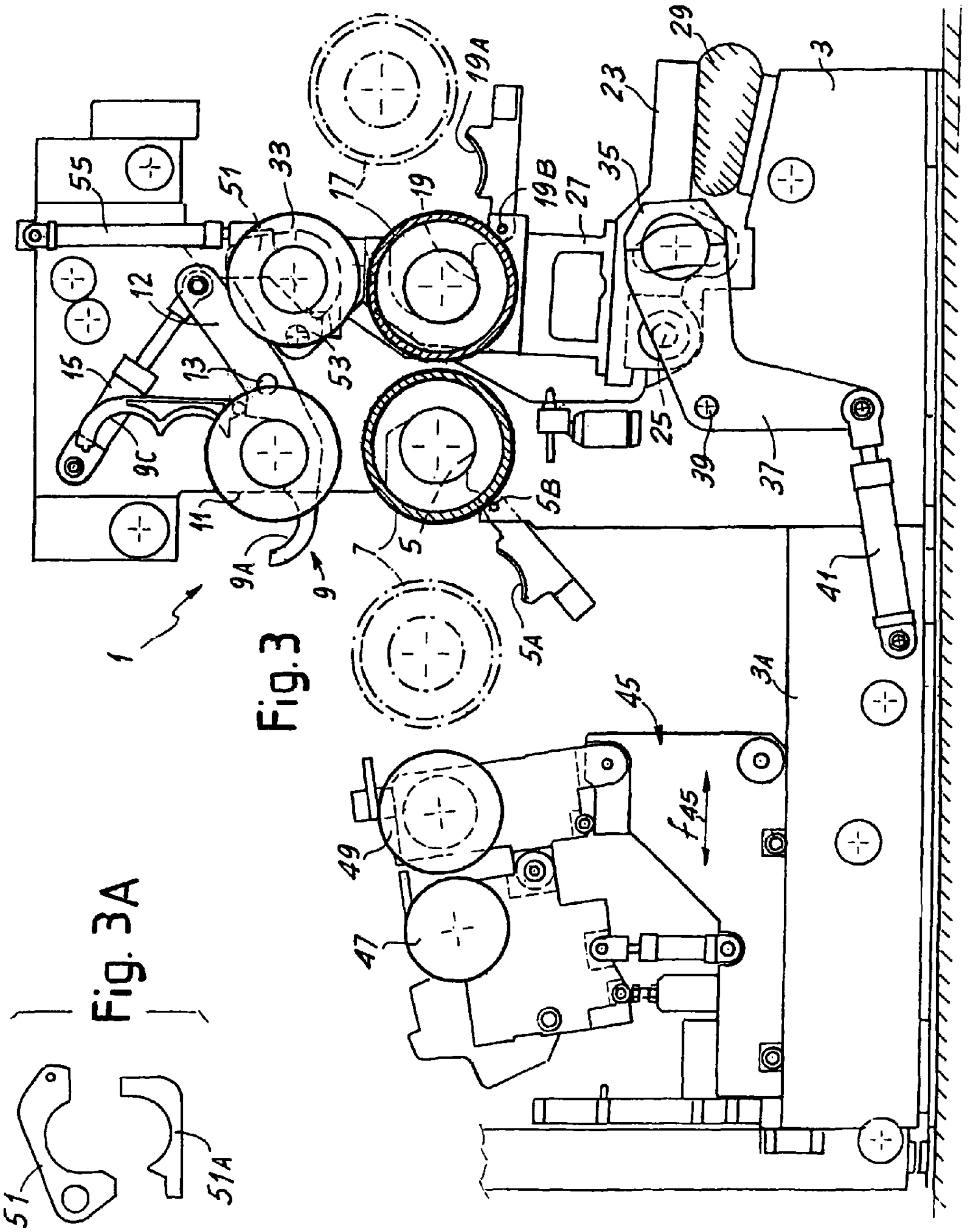
FIG. 3 shows the embossing unit in a second configuration in the open arrangement.
FIG. 3A shows a detail of the equipment utilized in the configuration of FIG. 3.
Figure 4:
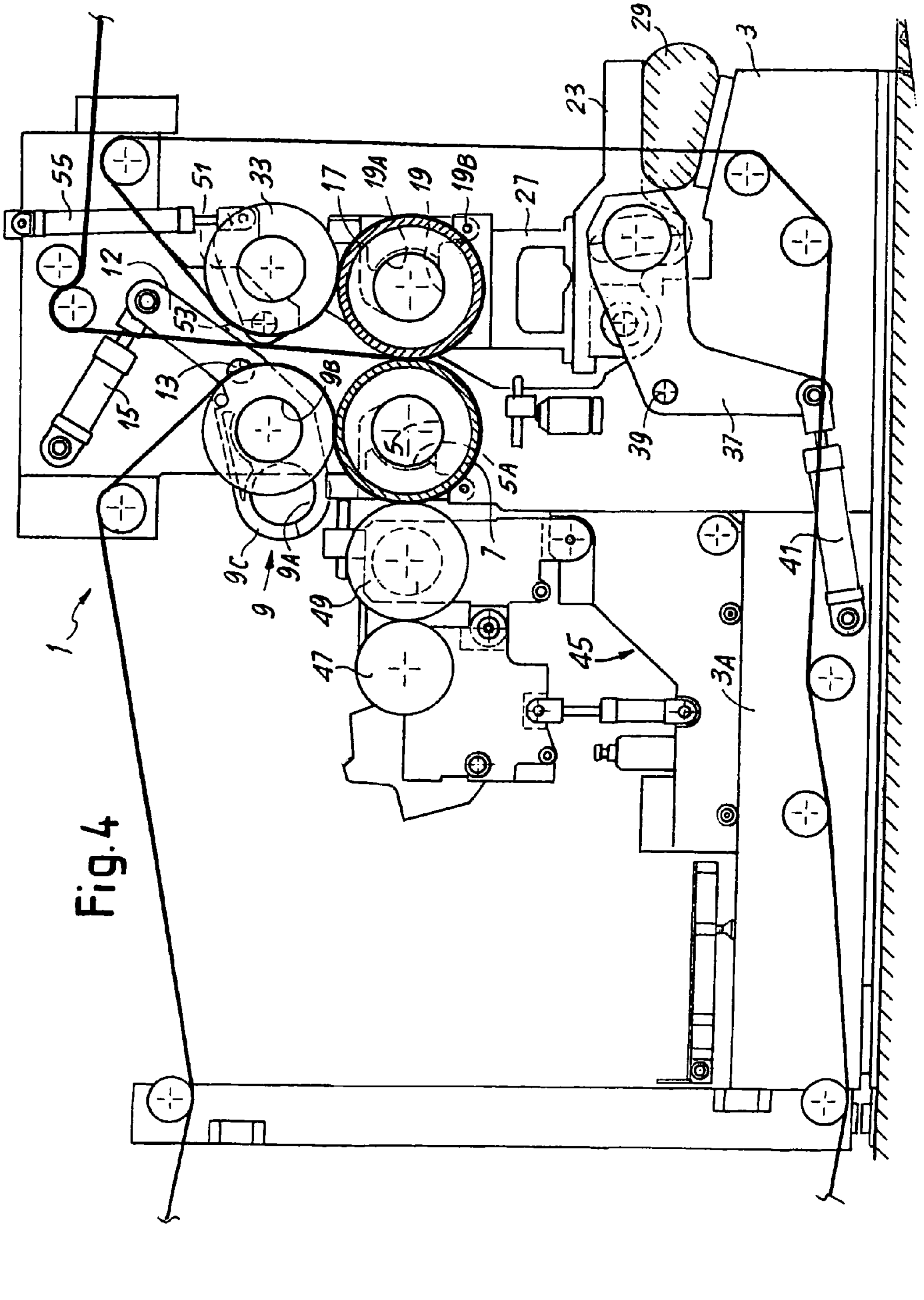
FIG. 4 shows the embossing unit in the configuration of FIG. 3 in the operating arrangement.

This second configuration is shown in FIGS. 3 and 4, where FIG. 3 shows the embossing unit 1 in the set-up phase, with the supports open, while FIG. 4 shows it in the operating arrangement during embossing and lamination of the plies, again indicated with V1 and V2 to produce the web material N.

It can be seen that in this configuration the support 35 is empty and held in an idle position with the arms 37 rotated clockwise with respect to the position taken thereby in FIGS. 1 and 2. The second pressure roller, again indicated with 33, which cooperates with the second embossing roller 17, is carried in this case by a fifth support 51, just as in the case of the other supports in fact composed of two support elements, one for each side member of the machine.

The support 51, or more precisely each support element for the two ends of the pressure roller 33, is pivoted in 53 to the respective side member of the machine and associated with a piston-cylinder actuator 55, which presses the pressure roller 33 against the embossing roller 17.

The support 51 of the pressure roller 33 in this configuration is shown in detail in FIG. 3A. It is completed by a movable portion 51A, which can be removed to allow insertion and removal of the pressure roller 33.

As can be seen in particular in FIG. 4, in this case during operation the two pressure rollers 11 and 33 are both located above the geometrical plane on which the two axes of the embossing rollers 7 and 17 lie. The feed path of the ply V2 is modified with respect to the configuration of FIGS. 1 and 2.

The possibility of configuring the embossing unit 1 in one or other of the two modes illustrated above makes it possible to choose the best arrangement of the embossing rollers and of the pressure rollers as a function of the type of embossing pattern, taking into account the deformations to which the embossing rollers are subjected due to their weight and to the thrusts exerted thereon by the pressure rollers 11 and 33.

With regard to the supports of the embossing rollers 7 and 17, and of the first pressure roller 11, the configuration of FIGS. 3 and 4 does not differ from the configuration of FIGS. 1 and 2.

The same embossing unit described above can be transformed to take a configuration for nested or "DESL" embossing, or to operate according to an "embossing-gluing" technique typical of the most modern embossing units. These last configurations will be described below with reference to FIGS. 5 and 6.

Figure 5:
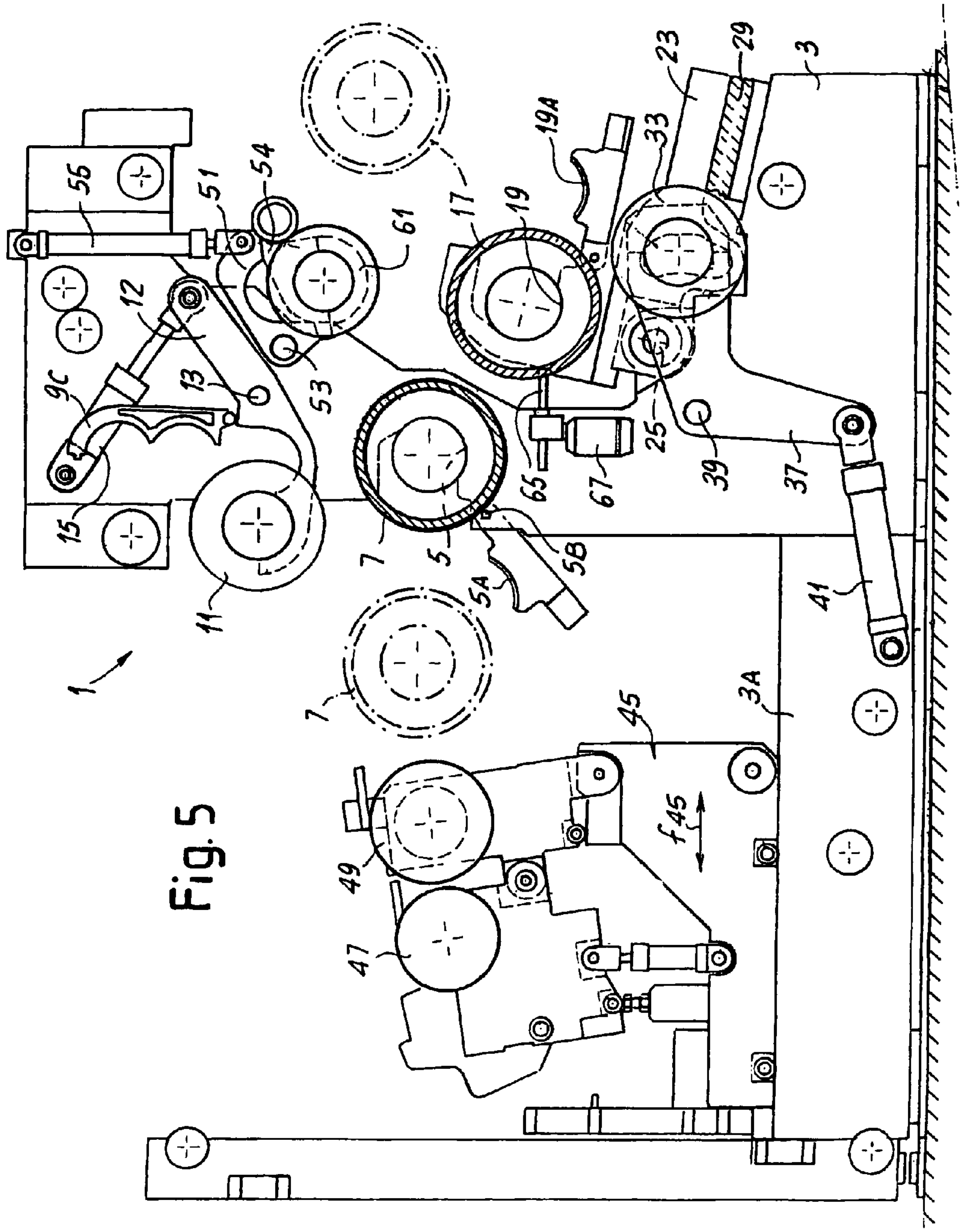
FIG. 5 shows, in the open arrangement, a third configuration of the embossing unit according to the invention.
Figure 6:
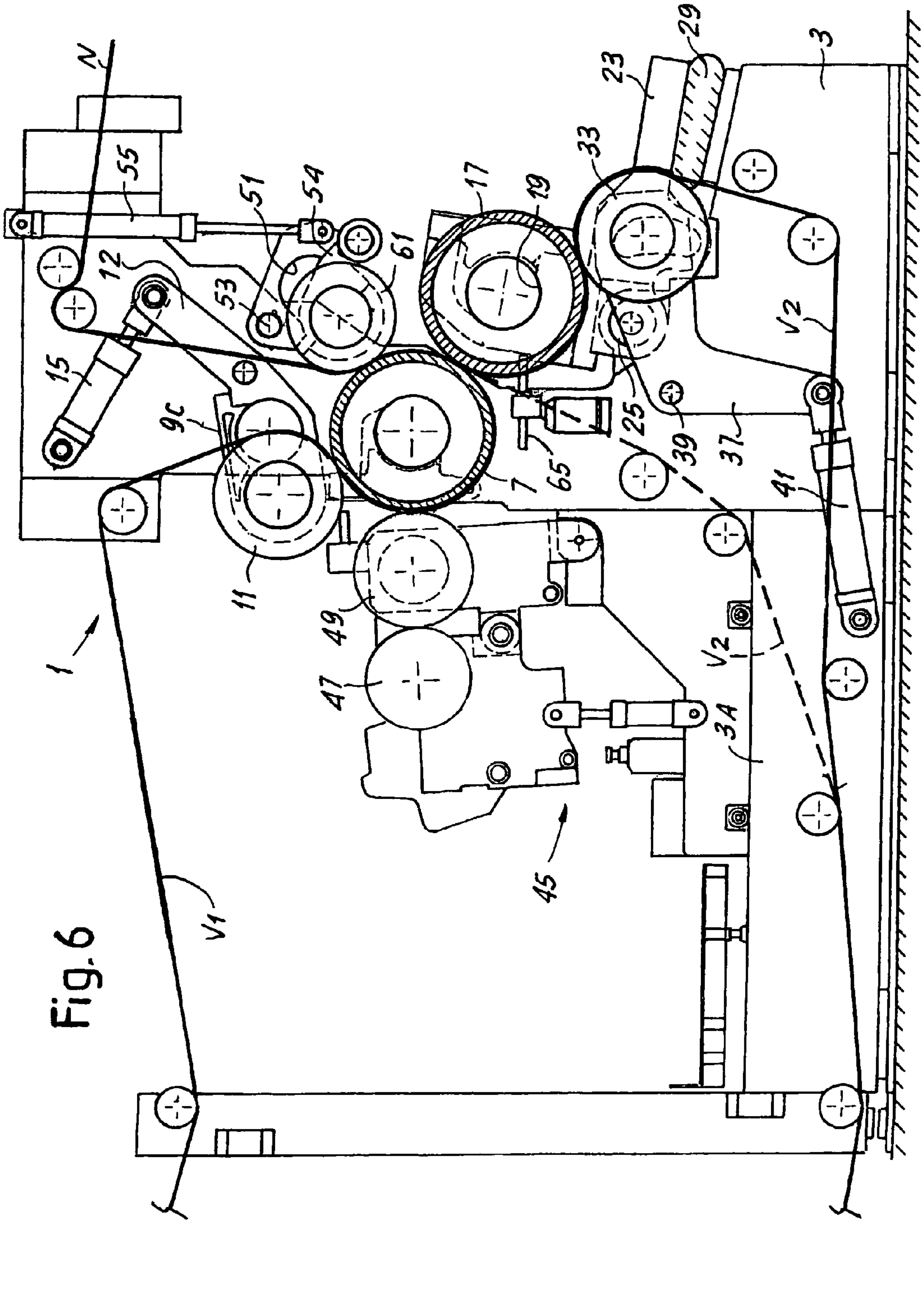
FIG. 6 shows the embossing unit in the configuration of FIG. 5 in the operating arrangement.

With respect to the configuration of FIGS. 1 and 2, in the configuration of FIGS. 5 and 6 (where the same numbers indicated the same or corresponding parts with respect to those of FIGS. 1 and 2), the first pressure roller 11 is arranged in the seat 9A instead of the seat 9B of the support. Moreover, the support 19, 19A of the second embossing roller 17 is placed closer to the oscillating base 23 carrying the fixture 21 directly on the oscillating base 23, removing the spacer 27 (FIG. 1A).

The second pressure roller 33 is supported in the support 35 which, due to an appropriate oscillation of the arms 37, is in a lower position with respect to the position that it takes in the configuration of FIGS. 1 and 2. This is due to the fact that the second embossing roller 17 is located with its axis below the height of the axis of the first embossing roller 7, and therefore lower with respect to its position in the configuration of FIGS. 1 and 2.

In the fifth support 51, not utilized in the configuration of FIGS. 1 and 2 and utilized instead in the configuration of FIGS. 5 and 6, there is housed a laminating roller or marrying roller 61. The laminating or marrying roller 61 cooperates with the first embossing roller 7 and not with the second embossing roller 17. Therefore, its position must be substantially different with respect to the position taken by the pressure roller 33 in the configuration in FIGS. 3 and 4. For this reason the support 51 is in this case integrated with an element 54 that is superimposed on the seat of the support 51 in which, in the configuration of FIGS. 3 and 4, the second pressure roller 33 is housed.

Figure 5A:
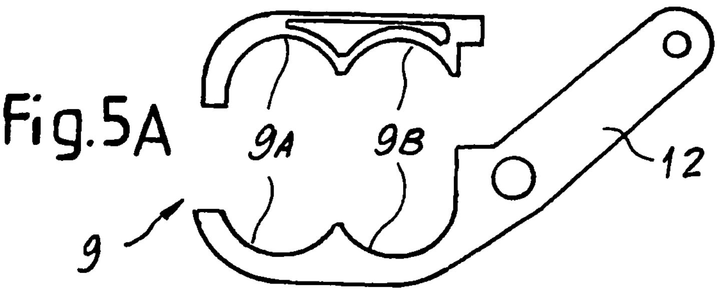
FIGS. 5A, 5B, 5C show details of the equipment utilized in the configuration of FIG. 5.
Figure 5B:
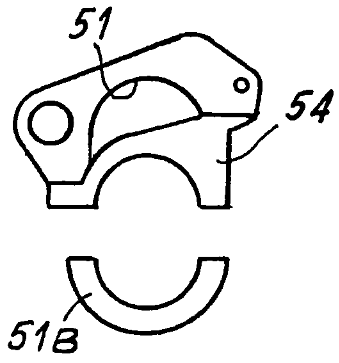

FIG. 5B shows in greater detail how the fixture defining the support of the laminating roller 61 is arranged with the intermediate element 54 that is superimposed on the original seat 51 in which the pressure roller 33 is arranged in the configuration of FIGS. 3 and 4. The reference 51B indicates the movable portion of the support which, both in the configuration of FIGS. 5 and 6 as well as in the configuration of FIGS. 3 and 4, closes the support of the roller.

Figure 5C:
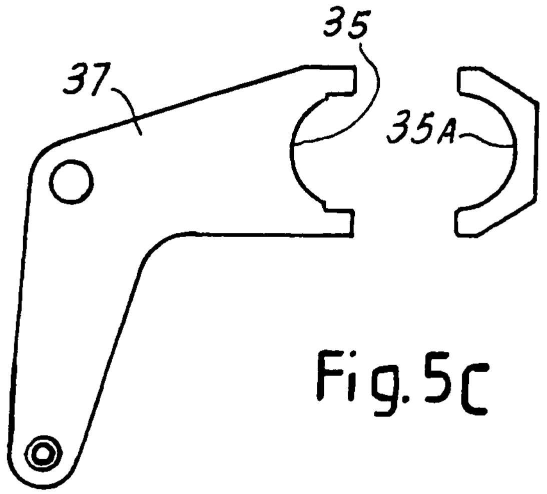

FIG. 5A shows separately in detail the double seat 9A, 9B of the support 9 for the first pressure roller. In this configuration, the first pressure roller 11 is arranged in the seat 9A of the support 9. FIG. 5C shows the support 35 with the movable portion 35A thereof, in which the pressure roller 33 is supported.

The position of the support 19 and therefore of the axis of the embossing roller 17 with respect to the first embossing roller 7 is defined in this configuration by a stop 65 adjustable, for example, through a servomotor 67. In fact, in this configuration the embossing roller 17 must not press against the embossing roller 7, but is maintained so that there is no reciprocal pressure in the nip between the two rollers. It must be understood that preferably the stop 65 is double, with a stop element on each side member of the embossing unit 1 and one or two servomotors for adjustment thereof.

In the configuration show in FIGS. 5 and 6, the embossing unit 1 can operate according to the "DESL" or nested technique, feeding the two plies V1 and V2 along the two paths indicated with the solid line in FIG. 6. The first ply V1 is fed between the first embossing roller 7 and the first pressure roller 11 to be embossed. Downstream of the embossing nip between the rollers 7 and 11, the glue dispensing unit 45 applies glue to the protuberances formed on the ply V1. The second ply V2 is embossed between the second pressure roller 33 and the second embossing roller 17 and both embossed plies V1 and V2 are fed through the nip between the embossing rollers 7 and 17, where however they are not laminated, as the two embossing rollers 7, 17 are not pressed against each other. The ply V1 remains in contact and fed around the embossing roller 7, while the ply V2 is detached from the embossing roller 17 and rests on the ply V1 fed around the embossing roller 7. The two plies thus joined are laminated between the embossing roller 7 and the laminating roller 61 carried by the support 54 to cause bonding thereof.

In the configuration of FIGS. 5 and 6, the embossing unit can also operate according to the "emboss-glue" technique, if necessary carrying the second embossing roller 17 and the respective pressure roller 33 to an idle position by modifying the position of the relative supports. For this purpose, it is sufficient to modify the path of the ply V2, making it follow the path indicated with the dashed line in FIG. 6. In this case, instead of being fed into the embossing nip between the embossing roller 17 and the pressure roller 33, the ply V2 is fed directly toward the embossing roller 17 and laid on the ply V1 embossed by the roller 7 and by the roller 11. The two plies V1 and V2 are then laminated and joined to each other by passing through the lamination nip defined by the embossing roller 7 and by the laminating roller 61. The oscillating base 23 on which the second embossing roller 17 and the second pressure roller 33 are supported can also be made to oscillate in a clockwise direction to move the embossing roller 17 marginally away from the embossing roller 7.

From the above description it is apparent that the embossing unit according to the invention can take a variety of configurations simply by fitting or removing equipment, modifying the position taken by the axes of the various rollers. This allows the users of the embossing unit to produce, with the same line and the same unit, different materials according to market demands with minimum operations to modify the configuration of the machine.

It is understood that the drawing only shows an example provided by way of a practical arrangement of the invention, which may vary in forms and arrangements without however departing from the scope of the concept underlying the invention. Any reference numbers in the appended claims are provided to facilitate reading of the claims with reference to the description and to the drawing, and do not limit the scope of protection represented by the claims.

The invention claimed is:

1. An embossing unit for embossing and joining at least two plies of web material, comprising in combination:

- a first support for a first embossing roller;
- a second support for a first pressure roller, said first pressure roller cooperating with said first embossing roller, said second support presenting two seats to receive and support the first pressure roller in two different positions with respect to said second support, wherein said first pressure roller cooperates with said first embossing roller in both of said two different positions;
- a third support, for a second embossing roller, said third support being structured to have at least two different operating positions;
- a fourth support for a second pressure roller structured to cooperate with said second embossing roller and to take at least an operating position and an idle position;
- a fifth support with a double seat to receive and support in two different positions alternatively a marrying roller co-acting with the first embossing roller or said second pressure roller cooperating with the second embossing roller.

2. The embossing unit as claimed in claim 1, wherein said third support has a variable configuration to carry the second embossing roller to at least two alternative operating positions with respect to the first embossing roller.

3. The embossing unit as claimed in claim 2, wherein said third support is constrainable to a base oscillating about an axis substantially parallel to an axis of said first embossing roller and said second embossing roller and of said first pressure roller and said second pressure roller, said base being structured to take at least two angularly different operating positions, and wherein a spacer element is interposable between said base and said third support, said spacer element being interposed or not interposed between the base and the third support according to an operating position to be taken by the second embossing roller with respect to the first embossing roller.

4. The embossing unit as claimed in claim 3, wherein said at least two angularly different operating positions of the base are defined by an adjustable stop.

5. The embossing unit as claimed in claim 4, wherein said adjustable stop is motorized.

6. The embossing unit as claimed in claim 1, wherein said second support comprises an arm oscillating about an axis of oscillation substantially parallel to the axis of said first pressure roller and the second pressure roller and of said first embossing roller and said second embossing roller, and wherein said two seats to support the first pressure roller are adjacent along a longitudinal extension of said oscillating arm.

7. The embossing unit as claimed in claim 2, wherein said second support comprises an arm oscillating about an axis of oscillation substantially parallel to the axis of said first pressure roller and said second pressure roller and of said first embossing roller and said second embossing roller, and wherein said two seats to support the first pressure roller are adjacent along a longitudinal extension of said oscillating arm.

8. The embossing unit as claimed in claim 3, wherein said second support comprises an arm oscillating about an axis of oscillation substantially parallel to the axis of said first pressure roller and said second roller and of said first embossing roller and said second embossing roller, and wherein said two seats to support the first pressure roller are adjacent along a longitudinal extension of said oscillating arm.

9. The embossing unit as claimed in claim 4, wherein said second support comprises an arm oscillating about an axis of oscillation substantially parallel to the axis of said first pressure roller and said second pressure roller and of said first embossing roller and said second embossing roller, and wherein said two seats to support the first pressure roller are adjacent along a longitudinal extension of said oscillating arm.

10. The embossing unit as claimed in claim 5, wherein said second support comprises an arm oscillating about an axis of oscillation substantially parallel to the axis of said first pressure roller and said second pressure roller and of said first embossing roller and said second embossing roller, and wherein said two seats to support the first pressure roller are adjacent along a longitudinal extension of said oscillating arm.

11. The embossing unit as claimed in claim 6, wherein said arm comprises two portions connectable and disconnectable to remove a pressure roller from a respective seat.

12. The embossing unit as claimed in claim 1, wherein said fifth support is oscillating about an axis substantially parallel to axes of the first embossing roller and the second embossing roller and of the first pressure roller and the second embossing roller.

13. The embossing unit as claimed in claim 2, wherein said fifth support is oscillating about an axis substantially parallel to axes of the first embossing roller and the second embossing roller and of the first pressure roller and the second pressure roller.

14. The embossing unit as claimed in claim 3, wherein said fifth support is oscillating about an axis substantially parallel to axes of the first embossing roller and the second embossing roller and of the first pressure roller and the second pressure roller.

15. The embossing unit as claimed in claim 4, wherein said fifth support is oscillating about an axis substantially parallel to axes of the first embossing roller and the second embossing roller and of the first pressure roller and the second pressure roller.

16. The embossing unit as claimed in claim 5, wherein said fifth support is oscillating about an axis substantially parallel to axes of the first embossing roller and the second embossing roller and of the first pressure roller and the second pressure roller.

17. The embossing unit as claimed in claim 6, wherein said fifth support is oscillating about an axis substantially parallel to axes of the first embossing roller and the second embossing roller and of the first pressure roller and the second pressure roller.

18. The embossing unit as claimed in claim 1, wherein said fifth support comprises an oscillating arm, a first element, or alternatively said first element and a second element, being connectable to said oscillating arm, said two seats being defined by said oscillating arm and by said first element, or alternatively by said second element and by said first element, said second element being interposed between said arm and said first element.

19. The embossing unit as claimed in claim 2, wherein said fifth support comprises an oscillating arm, a first element, or alternatively said first element and a second element, being connectable t said oscillating arm, said two seats being defined by said oscillating arm and by said first element, or alternatively by said second element and by said first element, said second element being interposed between said arm and said first element.

20. The embossing unit as claimed in claim 3, wherein said fifth support comprises an oscillating arm, a first element, or alternatively said first element and a second element, being connectable to said oscillating arm, said two seats being defined by said oscillating arm and by said first element, or alternatively by said second element and by said first element, said second element being interposed between said arm and said first element.

21. The embossing unit as claimed in claim 4, wherein said fifth support comprises an oscillating arm, a first element, or alternatively said first element and a second element, being connectable to said oscillating arm, said two seats being defined by said oscillating arm and by said first element, or alternatively by said second element and by said first element, said second element being interposed between said arm and said first element.

22. The embossing unit as claimed in claim 5, wherein said fifth support comprises an oscillating arm, a first element, or alternatively said first element and a second element, being connectable to said oscillating arm, said two seats being defined by said oscillating arm and by said first element, or alternatively by said second element and by said first element, said second element being interposed between said arm and said first element.

23. The embossing unit as claimed in claim 6, wherein said fifth support comprises an oscillating arm, a first element, or alternatively said first element and a second element, being connectable to said oscillating arm, said two seats being defined by said oscillating arm and by said first element, or alternatively by said second element and by said first element, said second element being interposed between said arm and said first element.

24. The embossing unit as claimed in claim 1, further comprising a gluing unit which cooperates with said first embossing roller.

25. The embossing unit as claimed in claim 24, wherein said gluing unit is mounted on a movable carriage to be moved toward and away from the first support, the second support, the third support and the fourth support.

26. An embossing unit for embossing and joining at least two plies of web material, comprising in combination:

a first support for a first embossing roller;

a second support for a first pressure roller, said first pressure roller cooperating with said first embossing roller, said second support presenting two seats to receive and support the first pressure roller in two different positions with respect to said second support, wherein said first pressure roller cooperates with said first embossing roller in both of said two different positions;

a third support, for a second embossing roller, said third support including a first pivot connection to a supporting structure and being structured to have at least two different operating positions;

a fourth support for a second pressure roller structured to cooperate with said second embossing roller and to take at least an operating position and an idle position;

a fifth support including a second pivot connection to said supporting structure and provided with a double seat to receive and support in two different positions alternatively a marrying roller co-acting with the first embossing roller or said second pressure roller cooperating with the second embossing roller.

* * * * *

UNITED STATES PATENT AND TRADEMARK OFFICE

CERTIFICATE OF CORRECTION

PATENT NO. : 8,915,283 B2
APPLICATION NO. : 12/449766
DATED : December 23, 2014
INVENTOR(S) : Mauro Gelli et al.

It is certified that error appears in the above-identified patent and that said Letters Patent is hereby corrected as shown below:

IN THE CLAIMS:

Column 10, claim 19, line 15, “connectable t” should read -- connectable to --.

Signed and Sealed this
Eighteenth Day of August, 2015

*Michelle K. Lee*

Michelle K. Lee
*Director of the United States Patent and Trademark Office*